(No Model.)

O. KROMER & F. RINKLEFF.
CLUTCH.

No. 278,024.

Patented May 22, 1883.

Attest:
A. J. Sprague
Chas. J. Hunt

Inventors:
Otto Kromer.
Frank Rinkleff.
By Thos. S. Sprague
Atty.

N. PETERS, Photo-Lithographer, Washington, D. C.

UNITED STATES PATENT OFFICE.

OTTO KROMER AND FRANK RINKLEFF, OF SANDUSKY, OHIO.

CLUTCH.

SPECIFICATION forming part of Letters Patent No. 278,024, dated May 22, 1883.

Application filed November 20, 1882. (No model.)

*To all whom it may concern:*

Be it known that we, OTTO KROMER and FRANK RINKLEFF, of Sandusky, in the county of Erie and State of Ohio, have invented new and useful Improvements in Clutches; and we hereby declare that the following is a full, clear, and exact description thereof, reference being had to the accompanying drawings, which form a part of this specification.

The nature of this invention relates to certain new and useful improvements in the construction of clutches—such as are peculiarly adapted for use in the building of harvesters—wherein the parts of the clutch may be disengaged without interrupting the motion of the main shaft, to which one member of the clutch is secured, and which passes through a rectangular sleeve, to which the other member of the clutch is secured.

The invention consists in the peculiar construction, combination, and operation of the various parts, as more fully hereinafter described.

Figure 1:
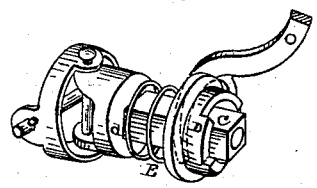
Figure 2:
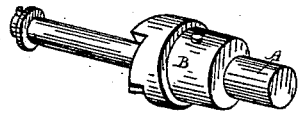

Figure 1 is a perspective view of one part of our improved clutch. Fig. 2 is a like view of the other member.

In the accompanying drawings, which form a part of this specification, A represents the main driving-shaft of a harvester, such as is usually employed to receive motion from the driving-wheel and communicate the same to the rakes. To this shaft is secured one member, B, of the clutch.

C represents a rectangular sleeve, the bore of which is designed to allow the main shaft to pass through and rotate therein. Upon this sleeve is sleeved the other member, D, of the clutch, and spring E, interposed between the end of this member and the head $a$ of the rectangular sleeve, compels engagement between the two members of the clutch when the parts are in position. The rectangular sleeve is provided with a head, $a$, and means for securing the same to the rake-gearing of the harvester, and the clutch is provided with a lever within easy reach of the driver, so that he may throw his rake into or out of action without interfering with the movements of the main shaft, which revolves within the sleeve without imparting motion to it or to the parts operated by it, except when the members of the clutch are in engagement.

What we claim as our invention is—

1. A two-part clutch wherein one member is rigidly secured to the shaft and the other member sleeved upon a rectangular sleeve, through which latter the shaft passes, and in which it rotates, substantially as described.

2. In combination with a two-part clutch, a shaft and rectangular sleeve, constructed as described, and spring, by means of which the two members of the clutch are forced into engagement, substantially as set forth.

3. In combination with a two-part clutch and shaft, a rectangular sleeve provided with means for attaching parts to be driven, the whole being constructed, combined, and operating substantially as and for the purposes set forth.

OTTO KROMER.
FRANK RINKLEFF.

Witnesses:
J. ERCKENER,
E. GRAND, Sr.